United States Patent
Bhagavath et al.

[11] Patent Number: 6,160,853
[45] Date of Patent: Dec. 12, 2000

[54] MODEM CONCENTRATOR

[75] Inventors: Vijay K. Bhagavath, Lincroft, N.J.; Joseph Thomas O'Neil, Staten Island, N.Y.; Roy Philip Weber, Bridgewater, N.J.

[73] Assignee: AT&T Corp, New York, N.Y.

[21] Appl. No.: 09/021,030

[22] Filed: Feb. 9, 1998

[51] Int. Cl.[7] .................................................. H04L 27/00
[52] U.S. Cl. ........................ 375/259; 370/434; 379/334
[58] Field of Search .................................. 375/219, 220, 375/222, 259, 260, 377; 379/258, 272, 333, 334, 335; 370/437, 433, 434, 282, 386

[56] References Cited

U.S. PATENT DOCUMENTS

| | | |
|---|---|---|
| 4,112,260 | 9/1978 | Kurokawa et al. . |
| 4,213,201 | 7/1980 | Gagnier et al. . |
| 4,516,238 | 5/1985 | Huang et al. . |
| 5,166,930 | 11/1992 | Braff et al. . |
| 5,570,084 | 10/1996 | Ritter et al. ...................... 340/825.05 |
| 5,577,042 | 11/1996 | McGraw, Sr. et al. . |
| 5,579,381 | 11/1996 | Courville et al. ...................... 379/201 |
| 5,588,119 | 12/1996 | Vincent et al. . |
| 5,651,002 | 7/1997 | Van Seters et al. ...................... 370/392 |
| 5,668,857 | 3/1996 | McHale ...................... 379/93.07 |
| 5,708,656 | 1/1998 | Noneman et al. ...................... 370/320 |
| 5,859,718 | 1/1999 | Yamamoto et al. ...................... 359/128 |

OTHER PUBLICATIONS

"LoopRunner™ ADSLAM™ with QuickDial™ On-Demand ADSL", NetSpeed, Inc. 1997.

*Primary Examiner*—Chi H. Pham
*Assistant Examiner*—Jean B. Corrielus

[57] ABSTRACT

A modem concentrator is provided that creates network-initiated connections to users of the network. According to the method, active downstream data is received from a data network at one data port. A controller of the modem concentrator reads the active downstream data and compares recipient information contained therein with stored identifiers of users. The identifiers are stored in association with identifiers of a user-side port to which the modem concentrator is connected. The controller identifies another data port associated with the identified recipient and causes a connection to be made between the one data port where the downstream data is received and the other data port connected to the user. The modem concentrator provides a use-once registration feature. When the concentrator processes upstream data, data from a user to be delivered to the network, it reads the upstream data to identify source information identifying the user that generated it. It stores the source information for use in later network-initiated connection attempts.

18 Claims, 4 Drawing Sheets

MODEM CONCENTRATOR

BACKGROUND OF THE INVENTION

The present invention provides a modem concentrator for use in connecting a plurality of hardwired users to a data network. The modem concentrator permits both user and network initiated connections.

As is known in communication and data network systems, users typically do not require continuous communication or data network service. Instead, users experience sporadic requirements for such services. Concentration is applied to such customers to conserve infrastructure costs of the communications or data network.

Concentration is known in the context of the public switched telephone network ("PSTN"). It involves switching telephone traffic from a large number of sources having infrequent demands for service to a smaller number of more frequently used data carriers. The data carriers typically cannot carry data from every source simultaneously.

For example, residential users of telephone service likely have encountered events where telephone calls cannot be placed because "all circuits are busy." Such events typically arise when telephone use is at its peak. This is an example of concentration. Perhaps one thousand residential customers may connect to a single central office in the PSTN. However, the central office connects to the remainder of the PSTN over lines having capacity to handle only one hundred simultaneous telephone calls. In this example, the one thousand residential telephone lines are concentrated to a data carrier having capacity for only one hundred calls. Because the residential customers' demands for service are infrequent, concentration does not degrade service significantly.

Concentration also finds application in the context of data networks, such as the Internet. In this context, customers of data network services may connect to a data network, such as the Internet, via a concentrator. The concentrator connects users at a plurality of first data ports with a data network at a plurality of second data ports. Users in this application do not move, therefore, a user may be associated with one of the data ports. The number of first data ports is greater than the number of second data ports. The users typically connect using an analog modem interface whereas the concentrator connects o the data network using a digital interface. Accordingly, the concentrator also performs a modem function. The concentrator in this context is in fact a "modem concentrator."

One such modem concentrator is disclosed in U.S. Pat. No. 5,668,857 to McHale ("McHale"). McHale discloses a communication server apparatus that establishes user initiated connections to the data network. However, it is limited because it does not establish user-network connections initiated from within the data network. Also, it cannot dynamically build an association between users and the data ports at which the users are connected to the modem concentrator.

Accordingly, there is a need in the art for a modern concentrator that establishes user-network connections initiated from within the network.

SUMMARY OF THE INVENTION

The disadvantages of the prior art are alleviated to a great extent by a method and apparatus that provides a modem concentrator that can create network initiated connections with a user. According to the method, active downstream data is received from a data network at one data port. A controller of the modem concentrator reads the active downstream data and compares recipient information contained therein with stored identifiers of users. The identifiers are stored in association with identifiers of a user-side port to which the modem concentrator is connected. The controller identifies another data port associated with the identified recipient and causes a connection to be made between the one data port where the downstream data is received and the other data port connected to the user.

The modem concentrator provides a use once registration feature. When the concentrator processes upstream data, data from a user to be delivered to the network, it reads the upstream data to identify source information identifying the user that generated it. It stores the source information for use in later network-initiated connection attempts.

DETAILED DESCRIPTION

Figure 1:
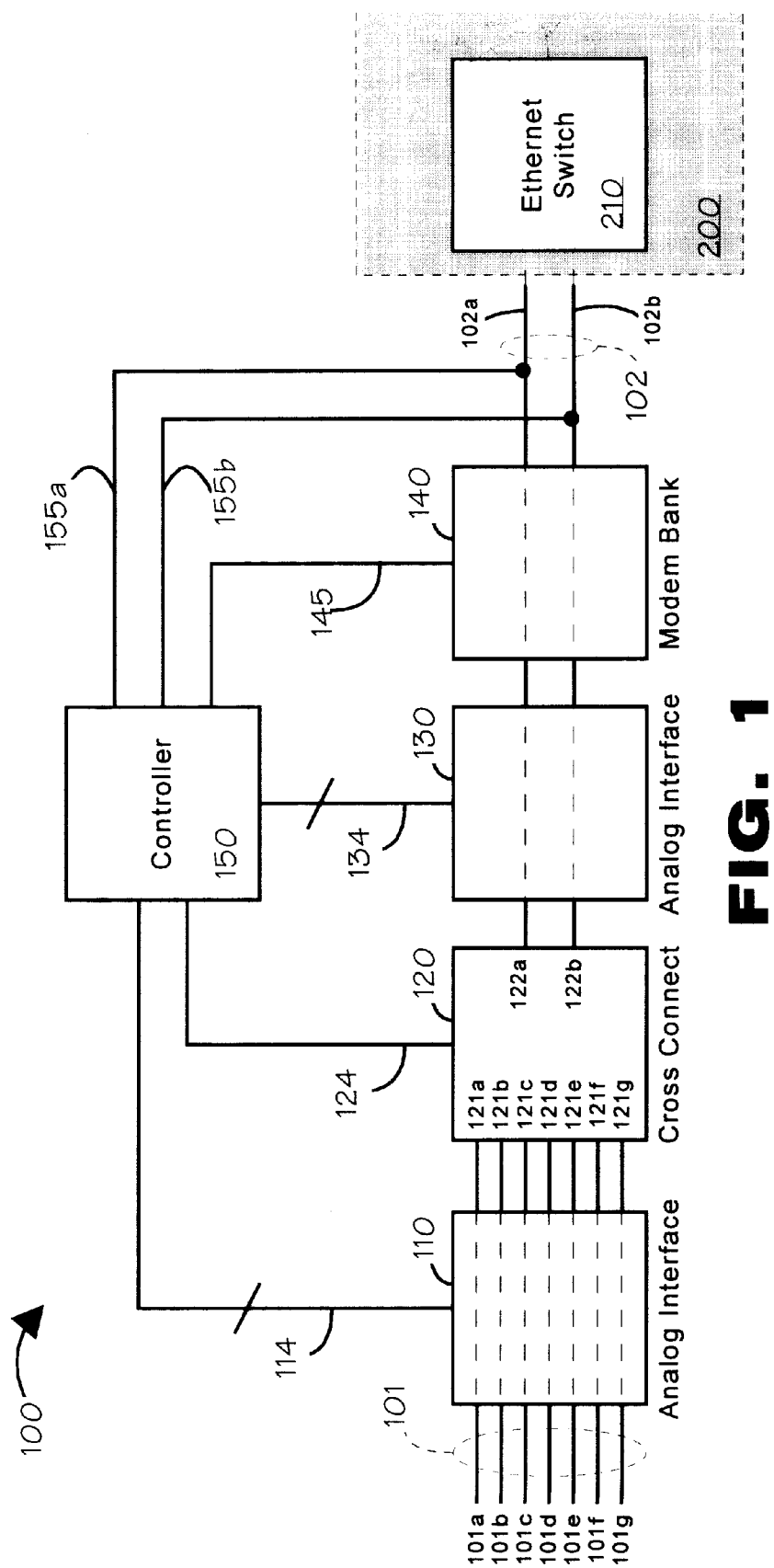
FIG. 1 illustrates a block diagram of the Modem concentrator constructed in accordance with an embodiment of the present invention.

As shown in FIG. 1, the present invention provides a modem concentrator 100 that interconnects a first data device to a data network. For example, the modem concentrator 100 may be used by an Internet service provider that connects its customers' computer equipment to the Internet. In this context, the modem concentrator 100 connects customers at a plurality of user-side data ports 101a-g (collectively, 101) to a data network 200, such as the Internet, at a plurality of network-side data ports 102a–b (collectively, 102). Typically, the number of user-side data ports 101 exceeds the number of network-side data ports 102.

The modem concentrator 100 is populated by a first analog interface 110, a cross connect switch 120, a second analog interface 130, a modem bank 140 and a controller 150. The first analog interface 110, the cross connect switch 120, the second analog interface 130 and the modem bank 140 establish dynamic data paths extending from the user-side data ports 101 to the network-side data ports 102. These components carry full duplex data. For illustrative purposes, data routed from any user-side data port 101 to a network-side data port 102 is labeled "upstream data." Data routed from any network-side data port 102 to a user-side data port 101 is labeled "downstream data."

The network-side data port 102 connects the modem concentrator 100 to a data network 200. Typically, the data port 102 communicates with a data switch 210 or other suitable component within the data network 200 operating, for example, in accordance with the IEEE 802.3 standard.

The first analog interface 110 receives data from the user-side data ports 101. In the embodiment of FIG. 1, seven data ports 101a–g are shown. However, the analog interface 110 may be configured to accommodate any desired number of data ports. The first analog interface 110 routes data from the user-side data ports 101 to the cross connect 120 unchanged. The first analog interface 110 also receives data from the cross connect 120 for delivery to the user-side data ports 101.

The first analog interface 110 communicates with the controller 150 over data activity lines 114. The data activity lines 114 inform the controller 150 when the first analog interface 110 carries active upstream data from any one of the user-side data ports 101. The data activity lines 114 may be provided as parallel data lines, one line for each user-side data port 101a–g. Thus, in the embodiment shown in FIG. 1, seven data activity lines 114 (not shown individually) would be provided to account for each of the seven user-side data ports 101a–g.

Where it is desired to conserve the number of data lines 114, a separate data activity line need not be provided for every user-side data port 101a–g. As an alternative, the data activity lines 114 may be subject to binary encoding. Binary encoding of signals is well known. When encoded, a fewer number of data activity lines 114 are provided than one line per input. A corresponding decoders provided at the controller 150, either in hardware or software.

The cross connect 120 is an analog cross connect switch matrix. Under control of the controller 150, the cross connect 120 connects data paths from the first analog interface 110 to data paths of the second analog interface 130. The switch matrix provides a first plurality of data ports 121a–g corresponding to the number of user-side data ports 101a–g. it also provides a second plurality of ports 122a–b corresponding to the number of network-side data ports 102a–b. The cross connect 120 is controlled by the controller 150 over line 124.

The second analog interface 130 operates in a similar manner to the first analog interface 110. It routes upstream data received from the cross connect 120 to the modem bank 140. It also routes downstream data received from the modem bank 140 to the cross connect 120. Data propagates through the second analog interface 130 over a number of data lines (not shown) that correspond to the number of network-side data ports 102a–b.

The second analog interface 130 generates data activity signals over data activity lines 134. The data activity lines 134 are input to the controller 150. As with data activity lines 114, data activity lines 134 may be parallel lines having one line for each input at the network-side data port 102. Alternatively, the second data activity lines 134 may be subject to binary encoding.

The modem bank 140 routes upstream data from the second analog interface 130 to the data network 200. It converts the analog upstream data to digital data. Thus, data output from the modem concentrator 100 at the network-side data ports 102 is digital data. The modem bank 140 also routes downstream data received from the data network 200 to the second analog interface 130. It converts digital data received at the network-side data port 102 to analog data.

As noted, the controller 150 establishes data paths through the modem concentrator 100 on a dynamic basis. The controller 150 includes a memory (not shown). The controller 150 monitors first and second data activity lines 114 and 134 to determine when live data is carried through the first and second analog interfaces 110 or 130. Also, it causes the cross connect switch 120 to establish bridging connections between individual data ports paths of the first and second analog interfaces 110, 130. The controller 10 also monitors digital data output at the network-side data ports 102 over lines 155a–b. Various methods of operation of the controller 150 are illustrated in FIGS. 2 and 3 herein.

It should be appreciated that the modem concentrator 100 illustrated in FIG. 1 provides fixed paths from the first data ports 101a–g to ports 121a–g on the cross connect 120. That is, data input to a particular data port (say, 101d) propagates to a predetermined port (121d) of the cross connect 120 and vice versa. Similarly, the modem concentrator 100 provides fixed paths from the network-side data ports 102a–b to ports 122a–b on the cross c connect 120. Data input to a particular network-side data port (say, 102b) propagates to a predetermined port (122b) of the cross connect 120 and vice versa. The cross connect 120 connects two fixed "sub-paths" to interconnect a user at user-side input port 101d to a predetermined network-side data port 102b.

Figure 2:
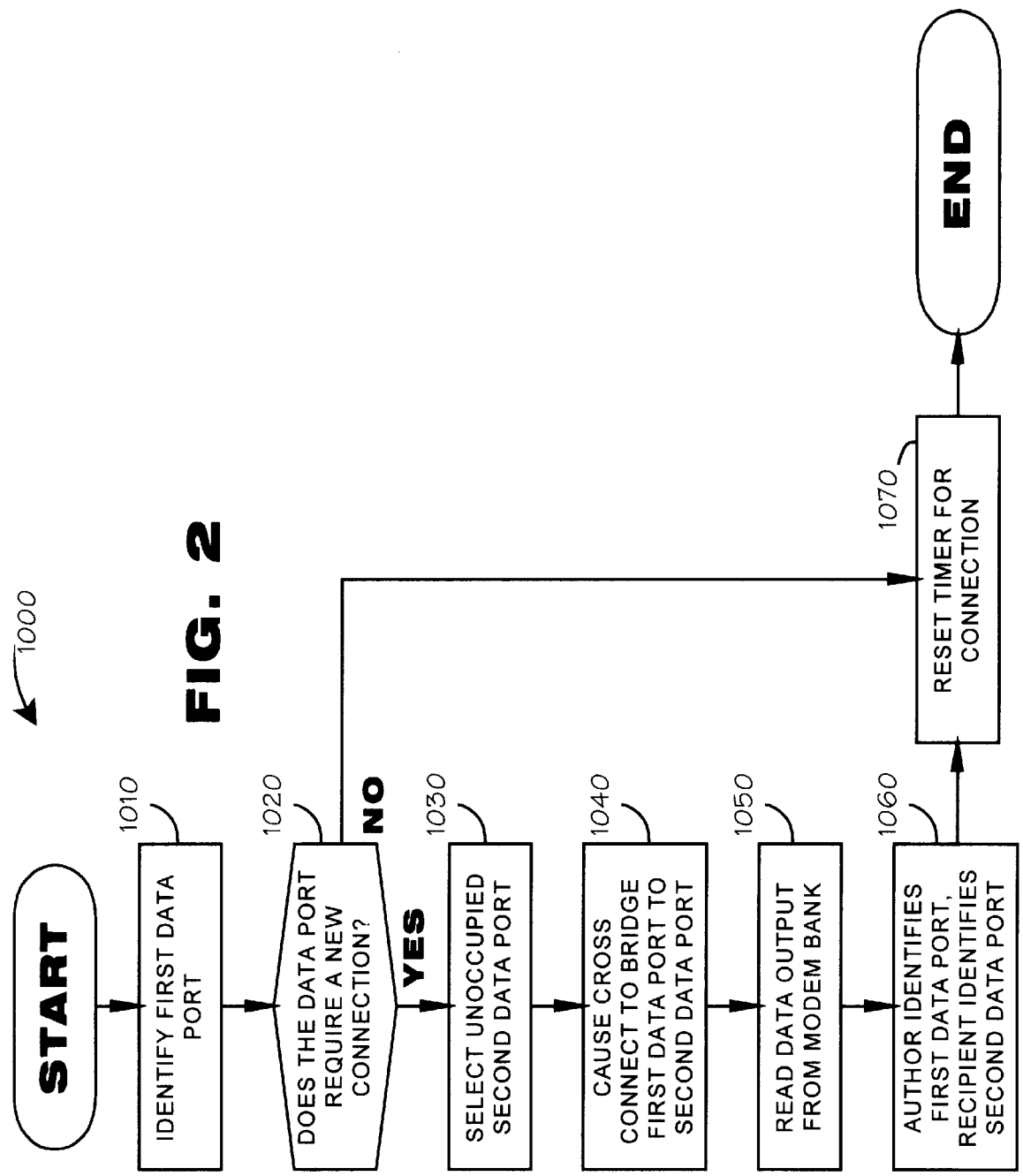
FIG. 2 illustrates a flow diagram of a method of operation of the controller associated with the modem concentrator of FIG. 1 when processing upstream packets in accordance with an embodiment of the present invention.
Figure 3:
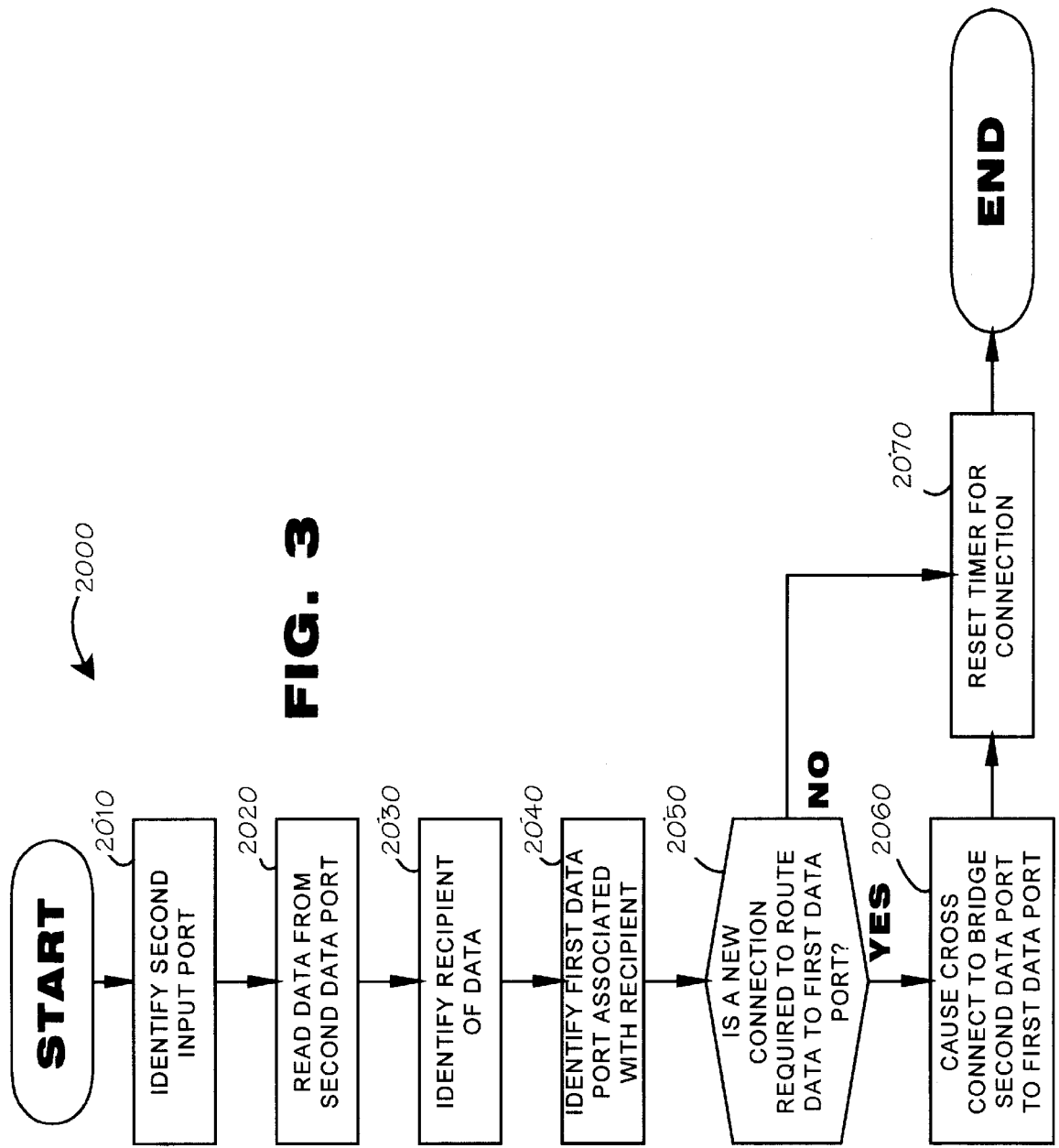
FIG. 3 illustrates a flow diagram of a method of operation of the controller associated with the modem centrator of FIG. 1 when processing downstream packets in accordance with an embodiment of the present invention.

In an embodiment, the controller 150 processes live upstream data according to the method 1000 of FIG. 2. The controller 150 initiates the method 1000 when it receives a data activity signal over line 114. The data activity signal indicates that live upstream data has been detected at one of the user-side data ports 101 (say, for example, port 101d). The upstream data must be routed to an available network-side data port 102. Typically, the data activity signal 114 acts as an interrupt signal to the controller 150.

The controller 150 identifies which one of the user-side data ports 101d carries the upstream data (Step 1010) and determines whether the one user-side data port 101d requires a new connection (Step 1020). If so, the controller 150 selects an unoccupied network-side data port (say, 102b) (Step 1030) and causes the cross connect 120 to create a connection between the corresponding ports 121d and 122b at the cross connect 120 (Step 040).

Identification of an available network-side data port 102b may occur in several ways. First, the controller 150 simply may maintain a table of available data paths in memory. Each time it connects a user-side data port (say 101a) to a network-side data port (102a), it removes the selected network-side data port (102a) from the table until the connection is deallocated. Second, the controller 150 may query the modem bank 140 to identify an unoccupied path. In such a case, the modem bank 140 may maintain a data register identifying the status of each data path, whether it is occupied or unoccupied. Because the paths through the modem bank 140 map directly to the network-side data ports 102, the controller 150 may read in the register over line 145 to determine which network-side data ports 102 are available.

Once the cross connect 120 establishes the connection identified by the controller 150, the upstream data passes through the cross connect 120, the second analog interface 130 and the modem bank 140 to the selected network-side data port 102b. As noted, the analog upstream data is digitized by the modem bank 140. The controller 150 reads the digital upstream data output from the modem bank 140 (Step 1050). It identifies originator and recipient fields contained in the data (Step 1060).

As is known, originator and recipient fields are conventional to data networks 200; they permit the network to route the data from a point of origination to a point of termination in the network 200. For example, where the digital data is formatted according to the known Transmission Control Protocol/Internet Protocol ("TCP/IP"), the source address may be used as the author field and the destination address may be used as the recipient field. For upstream data, the originator field identifies the user, the recipient field identifies where in the data network 200 the data is going. Accordingly, the controller 150 stores the originator field in memory in association with the user-side data port 101*d*. Also, the controller 150 stores the recipient field in memory in association with the network-side data port 102*b*. As shown below, the stored originator and recipient information is useful for processing downstream data.

Finally, the controller 150 initializes a timer measuring time since data was last routed through the cross connect switch 12C connection (Step 1070). If, at step 1020, the data does not require a new connection, the controller 150 re-initializes the timer associated with connection (Step 1070).

FIG. 3 illustrates a method of operation 2000 0f the controller 150 as it processes downstream data received from the data network 200. The method starts when the controller 1350 receives a data activity interrupt over data activity lines 134. In response, the controller 150 identifies which network-side data port (say, 102*a*) received the data (Step 2010). The controller 150 reads in the data from the network-side data port 102*a* (Step 2020). It identifies a recipient of the data which, for downstream data, identifies a user who is the intended recipient of the data (Stop 2030). The controller 150 refers the recipient data to memory to identify which user-side data port (say, 101*c*) is associated with the identified recipient (Step 2040).

When the user-side data port 101*c* is identified, the controller 150 determines whether a new connection is required for the data (step 2050). If so, the controller 150 causes the cross connect switch 120 to connect the network-side data port to the user-side data port 101*c* (Step 2060). If not, a connection already exists. In either case, the controller 150 resets the timer for the connection (Step 2070).

The controller 150 establishes software timers for each connection. They expire upon the conclusion of a predetermined period of time, for example, ten minutes. However, as shown in FIGS. 2 and 3, the timers are reset each time active upstream or downstream data is routed through the modern concentrator 100. Thus, the timers expire only when a connection has been inactive or the predetermined period of time.

A timer that expires may also be treated by the controller 150 as an interrupt. In response, the controller 150 causes the cross connect switch 120 to deallocate the related connection. The controller 150 also clears from memory any association of the network-side data port 102 and any network identifiers previously collected from upstream or downstream data according to either step 1060 (FIG. 2) or step 2010 (FIG. 3). However, identifiers of the users at the user-side input port are retained. They may be useful for later connections initiated from within the data network 200.

Once a connection is deallocated, data received by the modem concentrator 100 that would have been routed by a deallocated connection instead requires the modem concentrator 100 to establish a new connection as by, for example, one of the methods 1000 or 2000 of FIGS. 2 or 3.

As should be understood from the foregoing discussion, originator and recipient data is treated differently for upstream data than it is for downstream data. For upstream data, where data from a user propagates to the data network 200, the originator field identities the user and the recipient field identities a location in the network 200 where the upstream data will be delivered. The inverse occurs for downstream data. For downstream data, the recipient field identifies the user and the originator field identifies a location in the network 200 where the data originated.

Because the controller 150 retains stored identifiers of the users in memory, the modem concentrator 100 provides a "use once" registration functionality. That is, a user need only send upstream data once for the controller 150 to associate the user's user-side port and its network address. The controller 150 reads the user's address from originator field and stores it in memory. Thereafter, the modem concentrator 100 will be able to establish a network initiated connection to that registered user.

The modem concentrator 100 also provides an advantage in that it is scalable. Where one user at, say, user-side data port 101*e* is actually a network of users, the controller 150 may associate a plurality of network addresses to the port 101*e*. Provided each network user meets the use once requirement, the modem concentrator 100 will establish a network connection with any one of them when the connection is initiated from within the data network 200.

Figure 4:
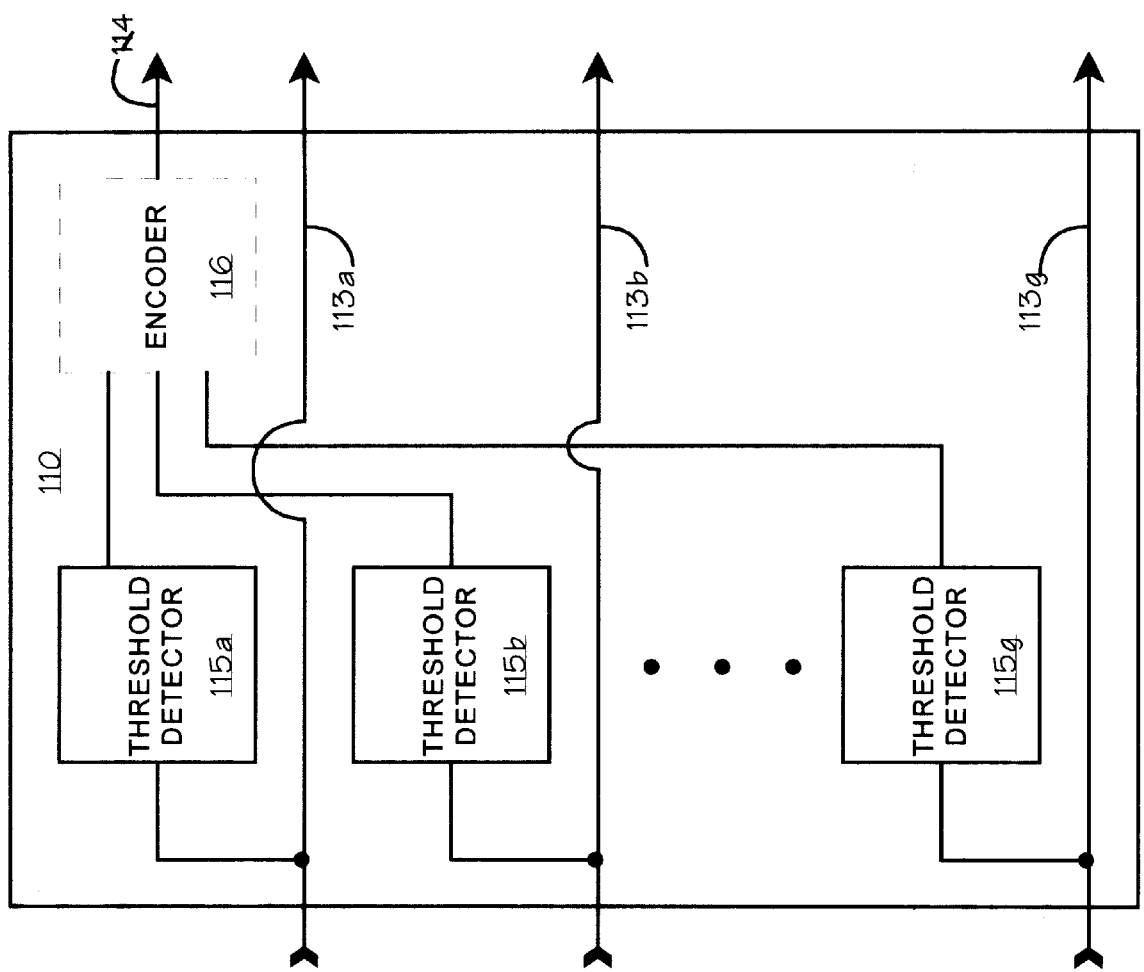
FIG. 4 illustrates a block diagram of a first or second analog interface constructed in accordance with an embodiment of the present invention.

Turning to FIG. 4, there is shown a block diagram of the first analog interface 110 constructed in accordance with an embodiment of the invention. As described above, data received at the user-side data ports propagates through the first analog interface 110 over data paths 113*a–g*. The first analog interface 110 also provides a threshold detector 115*a–g* for each data path 113*a–g*. Each threshold detector measures activity on a corresponding data path and, when the activity indicates that live upstream data has been received, generates an interrupt signal on its output. The outputs of the threshold detectors 115*a–g* may be encoded by an optional encoder 116 and output on data activity lines 114. Otherwise, the outputs of the threshold detectors 115*a–g* themselves are output on the data activity Lines 114.

The foregoing discussion of the first analog interface 110 also applies to the second analog interface 130 with one modification: The threshold detectors measure activity on corresponding data paths and generate an interrupt signal when the activity indicates that downstream data has been received. A threshold detector is provided for each of the data paths through the second analog interface 130. Otherwise, the structure and operation of the second analog interface 130 is the same as that of the first analog interface 110.

As is shown above, the present invention provides a modem concentrator 100 that establishes user-network connections that are initiated from within a data network 200. The modem concentrator 100 also provides a network connection having a use once registration feature: when a user sends upstream data to the data network, the user is registered with the modem concentrator 300 sufficiently for it to so establish network initiated connections.

Several embodiments of the present invention are specifically illustrated and described herein. However, it should be appreciated that modifications and variations of the present invention are covered by the above teachings and within the purview of the appended claims without departing from the spirit and intended scope of the invention.

We claim:

1. A modem concentrator for interconnecting users at a plurality of user-side data ports to a data network at a plurality of network-side data ports, the modem concentrator providing a use once registration feature, comprising:

a cross connect switch, first interface providing data paths from the user-side data ports to the cross connect switch, a second interface providing data paths from the cross connect switch, a modem bank connected to the data paths of the second interface and to the network-side data ports, the modem bank converting upstream data to a format for delivery to the data network, a memory, and a controller responsive to active upstream data at one of the user-side data ports by:

causing the cross connect switch to connect a data path in the first interface to an available data path in the second interface, reading the converted upstream data, and storing a source identifier contained within the converted upstream data in the memory in association with the one user-side data port.

2. The modem concentrator of claim 1, wherein the first interface is an analog interface.

3. The modem concentrator of claim 1, wherein the second interface is an analog interface.

4. The modem concentrator of claim 1, wherein the modem bank converts analog upstream data to digital data.

5. The modem concentrator of claim 4, wherein the digital data is formatted to TCP/IP.

6. The modem concentrator of claim 1, further comprising:

a timer to measure a duration of time the data path in the first interface is connected to the available data path in the second interface.

7. The modem concentrator of claim 6, wherein the cross connect switch automatically disconnects the data path in the first interface from the available data path in the second interface when a predetermined duration of time has been measured.

8. The modem concentrator of claim 1, further comprising:

a timer to measure a duration of time the connection of the data path in the first interface to the available data path in the second interface is idle.

9. The modem concentrator of claim 8, wherein the cross connect switch automatically disconnects the data path in the first interface from the available data path in the second interface when the connection is idle for a predetermined duration of time.

10. A modem concentrator for interconnecting users at a plurality of user-side data ports to a data network at a plurality of network-side data ports, the modem concentrator providing network initiated connections with a user, comprising:

a cross connect switch, first interface providing first data paths from the user-side data ports to the cross connect switch, a second interface providing second data paths from the cross connect switch, a modem bank connected to the second data paths and to the network-side data ports, the modem bank converting downstream data to a format for delivery to user-side data ports, a memory storing an identifier of a user in association with an identification of one user-side data port to which the user is connected, and a controller responsive to active downstream data at one of the user-side data ports by:

reading recipient information from the downstream data, retrieving from the memory an identifier of a user-side data port based upon the recipient information, and causing the cross connect switch to connect one of the second data paths to one of the first data paths to route the downstream data to the identified one user-side data port.

11. The modem concentrator of claim 10, wherein the first interface is an analog interface.

12. The modem concentrator of claim 10, wherein the second interface is an analog interface.

13. The modem concentrator of claim 10, wherein the modem bank coverts digital downstream data to analog data.

14. The modem concentrator of claim 13, wherein the digital downstream data is formatted to TCP/IP.

15. The modem concentrator of claim 14, further comprising:

a timer to measure a duration of time one of the second data paths is connected to one of the first data paths.

16. The modem concentrator of claim 15, wherein the cross connect switch automatically disconnects one of the second data paths from one of the first data paths when a predetermined duration of time has been measured.

17. The modem concentrator of claim 14, further comprising:

a timer to measure a duration of time the connection of one of the second data paths to one of the first data paths is idle.

18. The modem concentrator of claim 17, wherein the cross connect switch automatically disconnects the connection of one of the second data paths from one of the first data paths when the connection is idle for a predetermined duration of time.

* * * * *